(12) United States Patent
Castinado et al.

(10) Patent No.: US 11,321,127 B2
(45) Date of Patent: May 3, 2022

(54) NETWORK ENGINE FOR INTELLIGENT MULTI-FACETED RESOURCE ANALYSIS

(71) Applicant: Bank of America Corporation, Charlotte, NC (US)

(72) Inventors: Joseph Benjamin Castinado, North Glenn, CO (US); Kapil Chhibber, Davis, CA (US); Catherine Ann Crepps, Mooresville, NC (US); John Allen Sellers, Kennett Square, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 599 days.

(21) Appl. No.: 16/414,161

(22) Filed: May 16, 2019

(65) Prior Publication Data

US 2020/0364087 A1  Nov. 19, 2020

(51) Int. Cl.
| | |
|---|---|
| *G06F 9/46* | (2006.01) |
| *G06F 9/50* | (2006.01) |
| *G06N 20/00* | (2019.01) |
| *G06F 16/909* | (2019.01) |
| *G06F 16/9035* | (2019.01) |

(52) U.S. Cl.
CPC .......... *G06F 9/5011* (2013.01); *G06F 16/909* (2019.01); *G06F 16/9035* (2019.01); *G06N 20/00* (2019.01)

(58) Field of Classification Search
CPC .. G06F 9/5011; G06F 16/909; G06F 16/9035; G06N 20/00
See application file for complete search history.

(56) References Cited

U.S. PATENT DOCUMENTS

| | | | |
|---|---|---|---|
| 7,856,377 B2 | 12/2010 | Cohagan et al. |
| 8,860,587 B2 | 10/2014 | Nordstrom |
| 2007/0067297 A1 | 3/2007 | Kublickis |
| 2010/0106580 A1 | 4/2010 | Etheredge et al. |
| 2012/0265593 A1 | 10/2012 | Etheredge et al. |
| 2014/0012653 A1 | 1/2014 | Cohagan et al. |
| 2015/0206203 A1 | 7/2015 | Tietzen |
| 2019/0392489 A1 | 12/2019 | Tietzen et al. |
| 2020/0051112 A1 | 2/2020 | Nelsen et al. |
| 2020/0051117 A1 | 2/2020 | Mitchell |

*Primary Examiner* — Gregory A Kessler
(74) *Attorney, Agent, or Firm* — Moore & Van Allen PLLC; R. W. McCord Rayburn (57) ABSTRACT

A system for multi-faceted resource aggregation and deployment is provided, the system comprising: a memory device with computer-readable program code stored thereon; a communication device connected to a network; and a processing device, wherein the processing device is configured to execute the computer-readable program code to: generate a user profile comprising historical user interaction data associated with a user; establish a connection to a resource location associated with the user; identify an existing resource associated with the resource location; determine an additional resource based on identifying the existing resource, wherein the additional resource is complementary to the existing resource; aggregate the existing resource and the additional resource into a multivariable resource collection; and configure a resource deployment based on the multivariable resource collection and the user profile, wherein the resource deployment is configured to complete a multi-faceted interaction using a combination of the multivariable resource collection.

20 Claims, 7 Drawing Sheets

NETWORK ENGINE FOR INTELLIGENT MULTI-FACETED RESOURCE ANALYSIS

BACKGROUND

Multi-faceted interactions may grow increasingly complex as additional resource inputs are made available to a user. As a result, there exists a need for a resource aggregation and deployment engine for determining optimal deployment of resources in response to these multivariable interactions, wherein a resources may be properly utilized.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system for multi-faceted resource aggregation and deployment is provided, the system comprising: a memory device with computer-readable program code stored thereon; a communication device connected to a network; and a processing device, wherein the processing device is configured to execute the computer-readable program code to: generate a user profile comprising historical user interaction data associated with a user; establish a connection to a resource location associated with the user; identify an existing resource associated with the resource location; determine an additional resource based on identifying the existing resource, wherein the additional resource is complementary to the existing resource; aggregate the existing resource and the additional resource into a multivariable resource collection; and configure a resource deployment based on the multivariable resource collection and the user profile, wherein the resource deployment is configured to complete a multi-faceted interaction using a combination of the multivariable resource collection.

In one embodiment, the processing device is further configured to: compare the user profile to a plurality of stored user profiles associated with other users; determine a similarly situated user from the other users based on comparison of the user profile; and identify the additional resource based on at least one resource associated with the similarly situated user.

In another embodiment, the system further comprises at least one of an artificial intelligence system and a machine learning system configured for processing multivariable resource collection. In yet another embodiment, the processing device is further configured to determine an array of resource deployment options for completing the multi-faceted interaction. In yet another embodiment, completing the multi-faceted interaction comprises determining a maxima or minima solution associated with the multivariable resource collection. In yet another embodiment, completing the multi-faceted interaction comprises configuring the resource deployment to maximize a supplemental resource or minimize a cost of the multi-faceted interaction.

In yet another embodiment, the additional resource is associated with a third-party entity system, and wherein the processing device is further configured to: establish an external link to the third-party entity system; and enroll the user automatically with the additional resource via the external link to the third-party entity system, wherein the resource further comprises a resource vehicle and a resource location maintained by the third-party entity system. In yet another embodiment, the processing device is further configured to: present the additional resource to the user via an interface of a user application; and receive authorization from the user before automatically enrolling the user with the additional resource.

A computer program product for multi-faceted resource aggregation and deployment is provided, wherein the computer program product comprises a non-transitory computer-readable medium comprising computer-readable instructions, the computer-readable instructions, when executed by a processing device, cause the processing device to: generate a user profile comprising historical user interaction data associated with a user; establish a connection to a resource location associated with the user; identify an existing resource associated with the resource location; determine an additional resource based on identifying the existing resource, wherein the additional resource is complementary to the existing resource; aggregate the existing resource and the additional resource into a multivariable resource collection; and configure a resource deployment based on the multivariable resource collection and the user profile, wherein the resource deployment is configured to complete a multi-faceted interaction using a combination of the multivariable resource collection.

In one embodiment, the computer-readable instructions, when executed by the processing device, cause the processing device to: compare the user profile to a plurality of stored user profiles associated with other users; determine a similarly situated user from the other users based on comparison of the user profile; and identify the additional resource based on at least one resource associated with the similarly situated user.

In another embodiment, the computer program product further comprises at least one of an artificial intelligence system and a machine learning system configured for processing multivariable resource collection. In yet another embodiment, the computer-readable instructions, when executed by the processing device, cause the processing device to determine an array of resource deployment options for completing the multi-faceted interaction. In yet another embodiment, completing the multi-faceted interaction comprises determining a maxima or minima solution associated with the multivariable resource collection. In yet another embodiment, completing the multi-faceted interaction comprises configuring the resource deployment to maximize a supplemental resource or minimize a cost of the multi-faceted interaction.

In yet another embodiment, the additional resource is associated with a third-party entity system, and wherein the processing device is further configured to: establish an external link to the third-party entity system; and enroll the user automatically with the additional resource via the external link to the third-party entity system, wherein the resource further comprises a resource vehicle and a resource location maintained by the third-party entity system. In yet another embodiment, the computer-readable instructions, when executed by the processing device, cause the processing device to: present the additional resource to the user via an interface of a user application; and receive authorization from the user before automatically enrolling the user with the additional resource.

A computer-implemented method for multi-faceted resource aggregation and deployment is provided, the computer-implemented method comprising: generating a user profile comprising historical user interaction data associated with a user; establishing a connection to a resource location associated with the user; identifying an existing resource associated with the resource location; determining an additional resource based on identifying the existing resource, wherein the additional resource is complementary to the existing resource; aggregating the existing resource and the additional resource into a multivariable resource collection; and configuring a resource deployment based on the multivariable resource collection and the user profile, wherein the resource deployment is configured to complete a multi-faceted interaction using a combination of the multivariable resource collection.

In one embodiment, the computer-implemented method of further comprises: comparing the user profile to a plurality of stored user profiles associated with other users; determining a similarly situated user from the other users based on comparison of the user profile; and identifying the additional resource based on at least one resource associated with the similarly situated user.

In another embodiment, the computer-implemented method further comprises at least one of an artificial intelligence system and a machine learning system configured for processing multivariable resource collection.

In yet another embodiment, the computer-implemented method further comprises determining an array of resource deployment options for completing the multi-faceted interaction.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention are directed resource aggregation and deployment. In some embodiments, the system described herein may be configured to analyze and process complex, multi-faceted interactions. Multi-faceted interactions are interactions potentially requiring deployment of a combination of resources in order to meet the requirements of the interaction, the deployment of the combination of resources comprising layers of interconnected resources operating in unison. As the various resource layers may be combined in a number of ways, the complexity of determining an optimal solution (e.g., maxima or minima) increases with the inclusion of additional variables (i.e., available resource options). A resource aggregation and deployment engine as described herein may be configured to analyze and process the various resource layers and connections present in a multi-faceted interaction. Furthermore, the system may be configured to configure or tune deployment of the user resources in order to optimize resource potential and/or provide an array of options for completing a multi-faceted interaction. In some embodiments, the system may leverage artificial intelligence and machine learning technology to analyze multivariable data in real-time and provide an assortment of determined resource deployments for a collection of user resources.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the resource aggregation engine and system disclosed herein. In some embodiments, a user may be a computing device user, a phone user, a mobile device application user, a customer of an entity or business, a financial institution customer (e.g., an account holder or a person who has an account (e.g., banking account, credit account, or the like)), and/or employee of an entity. In a specific embodiment, a user may be a customer accessing a resource stored in a resource location via an associated user device. In another specific embodiment, a user operates, employs, or otherwise uses a known resource, wherein the resource aggregation engine identifies and automatically implements for the user one or more additional known resources and/or unknown resources for the user. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, entertainment devices, or any combination of the aforementioned. The device may be used by the user to access the system directly or through an application, online portal, internet browser, virtual private network, or other connection channel.

As used herein, the term "resource" may refer to a computing resource, electronic data, or a currency or the like having value (e.g., funds, points, travel miles, discounts, loyalty rewards, or the like). A computing resource may refer to elements of one or more computing devices (e.g., processor, memory, communication device, etc.) networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison). A "resource" may further refer to a membership that may provide access to one or more benefits. As used herein, a "resource location" may refer to a location for storage of one or more resources. A resource storage location may include an account (e.g., a savings or checking account, loyalty account, etc.) or a data storage location (e.g., a datastore or memory device). As used herein, a "resource vehicle" may refer to any medium for resource conveyance from one resource location to another. For example, a resource vehicle may comprise a credit or debit card, a check, a wire transfer, a gift card, coupons, or the like. In one embodiment, a resource vehicle may comprise a data transfer mechanism or device (e.g., a thumb drive or other removable data storage).

As used herein, an "interaction" or "connection" may refer to any communication between one or more users, one or more entities or institutions, and/or one or more devices or systems within the system environment described herein. For example, an interaction may refer to a transfer or exchange of resources (e.g., data, information, funds, etc.) between systems, devices, and/or application; an accessing of stored data by one or more devices; a transmission of a requested task; a sharing or leveraging of resources (e.g., computing resources) between device; or the like. An interaction may include user interactions with a user interface (e.g., clicking, swiping, text or data entry, etc.), authentication actions (e.g., signing-in, username and password entry, PIN entry, etc.), account actions (e.g., account access, fund transfers, etc.) and the like. In a specific embodiment, an "interaction" may refer to a resource transfer executed between one or more users and/or entities (e.g., a transaction).

As used herein, the term "entity" may be used to include any organization or collection of users that may interact with the resource aggregation engine and system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, asset management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. In a specific embodiment, an entity is a resource providing entity such as a financial institution that provides a resource vehicle and/or location (e.g., a credit card and associated account) to a user. The resource vehicle and/or location may include supplementary resources such as reward points or the like.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, database, or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module may monitor a user input in the system. In further embodiments, the system may store said user input during an interaction in order to generate a user interaction profile that characterizes regular, common, or repeated interactions of the user with the system. In some embodiments, "monitoring" may further comprise analyzing or performing a process on something such as a data source either passively or in response to an action or change in the data source.

Figure 1:
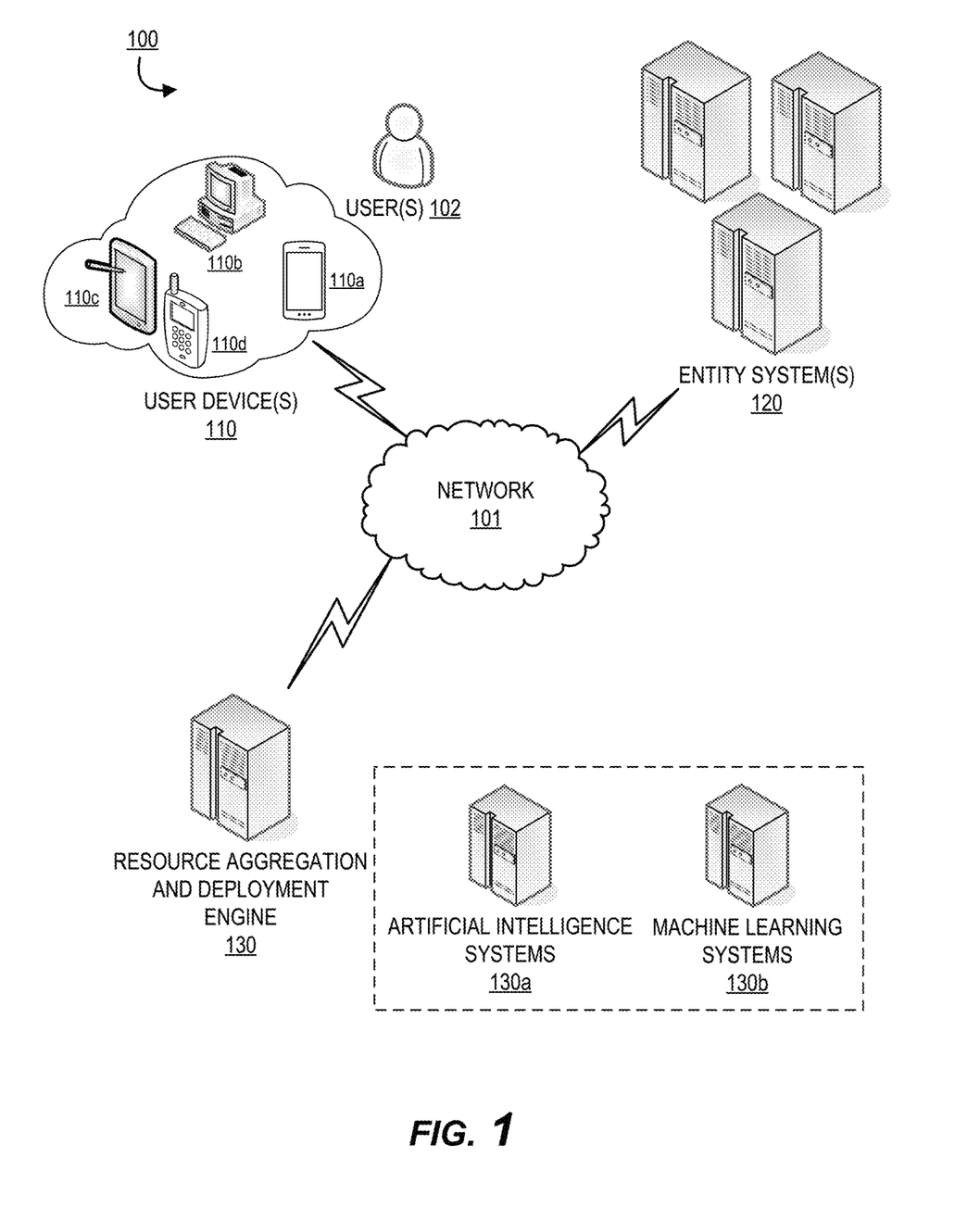
FIG. 1 provides a resource aggregation and deployment system environment, in accordance with one embodiment of the invention.

FIG. 1 provides a resource aggregation engine system environment 100, in accordance with one embodiment of the invention. As illustrated in FIG. 1, resource aggregation and deployment engine or system 130 is operatively coupled, via a network 101, to the user device(s) 110 (e.g., a plurality of user devices 110a-110d) and the entity system(s) 120. In this way, the resource aggregation and deployment engine 130 can send information to and receive information from the user device 110 and the entity system 120. In the illustrated embodiment, the plurality of user devices 110a-110d provide a plurality of communication channels through which the entity system 120 and/or the resource aggregation and deployment engine 130 may communicate with the user 102 over the network 101.

In the illustrated embodiment, the resource aggregation and deployment engine 130 further comprises an artificial intelligence (AI) system 130a and a machine learning system 130b which may be separate systems operating together with the resource aggregation and deployment engine 130 or integrated within the resource aggregation and deployment engine 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120 via a user device 110 while a data flow between the user device 110 and the entity system 120 is intercepted and monitored by the resource aggregation and deployment engine 130 over the network 101. In some embodiments a user 102 is a user requesting service from the entity or interacting with an account maintained by the entity system 120. In an alternative embodiment, the user 102 is an individual interacting with the resource aggregation and deployment engine 130 over the network 101 and authorizing input of user resources and information from the entity systems 120 to the resource aggregation and deployment engine 130 for processing and analysis.

Figure 2:
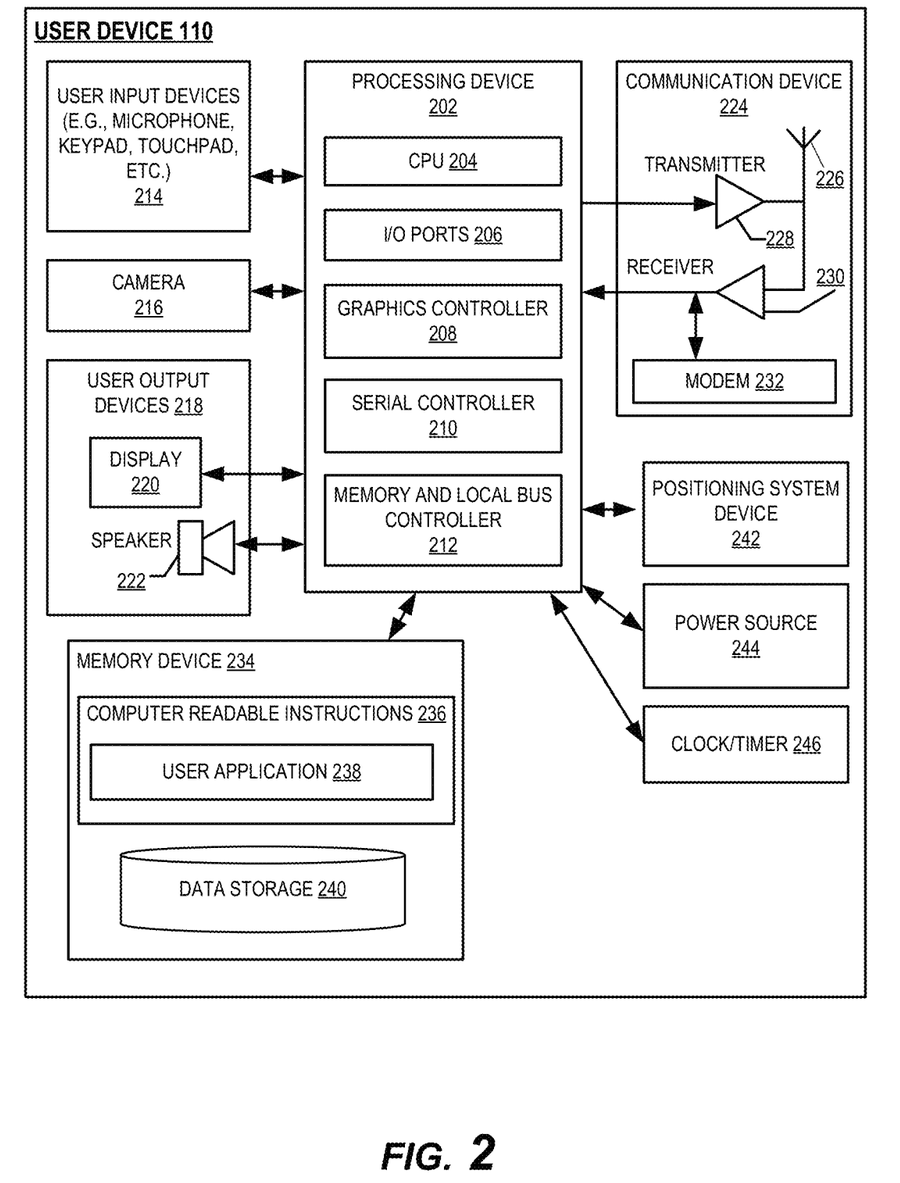
FIG. 2 provides a block diagram of a user device, in accordance with one embodiment of the invention.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user is a customer of a financial entity and the user application 238 is a resource management application providing access to a resource location maintained by the entity system 120 wherein the user may interact with a resource location via a user interface of the user application 238.

The processing device 202 may be configured to use the communication device 224 to communicate with one or more other devices on a network 101 such as, but not limited to the entity system 120 and the resource aggregation and deployment engine 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Figure 3:
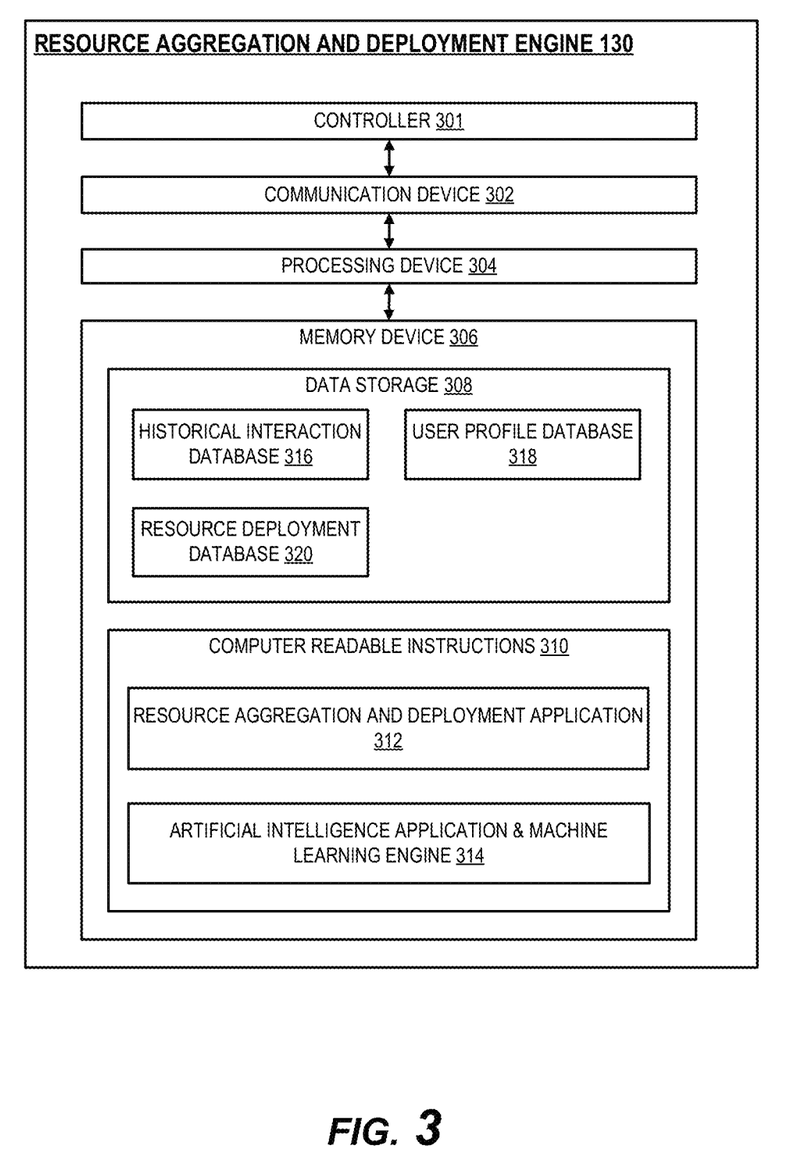
FIG. 3 provides a block diagram of resource aggregation and deployment engine, in accordance with one embodiment of the invention.

FIG. 3 provides a block diagram of a resource aggregation and deployment engine or system 130, in accordance with one embodiment of the invention. The resource aggregation and deployment engine 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the resource aggregation and deployment engine 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the resource aggregation and deployment engine 130 comprises computer-readable instructions 310 stored in the memory device 306, which in one embodiment includes the computer-readable instructions 310 of a resource aggregation and deployment application 312 and an artificial intelligence application 314 which further comprises a machine learning engine. In one embodiment, the artificial intelligence application 322 and machine learning engine may be utilized by the resource aggregation and deployment application 312 to monitor and process received data for resource deployment decisioning.

In some embodiments, the memory device 306 includes data storage 308 for storing data related to the system environment, but not limited to data created and/or used by the resource aggregation and deployment application 312 and the artificial intelligence application and machine learning engine 314, such as a historical interaction database 316, user profile database 318, and resource deployment database 320.

The historical interaction database 316 is used to store information regarding past interactions (e.g., account actions, transactions, communications, inputs) with the user 102. In some embodiments, the historical interaction database 316 may be configured to store data from an incoming data stream in real-time. The user profile database 318 is used to store user profiles generated by the system from the collected user data and information (e.g., historical data, resource data, etc.). The system may be configured to access and update the stored user profiles from the user profile database 318 as additional information is collected. The resource deployment database 320 is used for storing aggregated resources and calculated resource deployment options as determined by the system. In one embodiment, the system continuously updates the resource deployment options based on continued or subsequent user interactions and data collected by the system.

In one embodiment of the invention, the resource aggregation and deployment engine 130 may associate with applications having computer-executable program code that instruct the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the resource aggregation and deployment engine 130 further comprises a dynamic optimization algorithm to be executed by the processing device 304 or a controller for calibrating or tuning resource deployment options from large collections of available resources and resource locations. The dynamic optimization algorithm may further be updated with new information associated with current user decisions, wherein the new information may be continuously injected back into the optimization algorithm in response to real-time decisioning.

Embodiments of the resource aggregation and deployment engine 130 may include multiple systems, servers, computers or the like maintained by one or many entities. In some embodiments, the resource aggregation and deployment engine 130 may be part of the entity system 120. In other embodiments, the entity system 120 is distinct from the resource aggregation and deployment engine system 130. The resource aggregation and deployment engine 130 may communicate with the entity system 120 via a secure connection generated for secure encrypted communications between the two systems either over the network 101 or alternative to the network 101.

Figure 4:
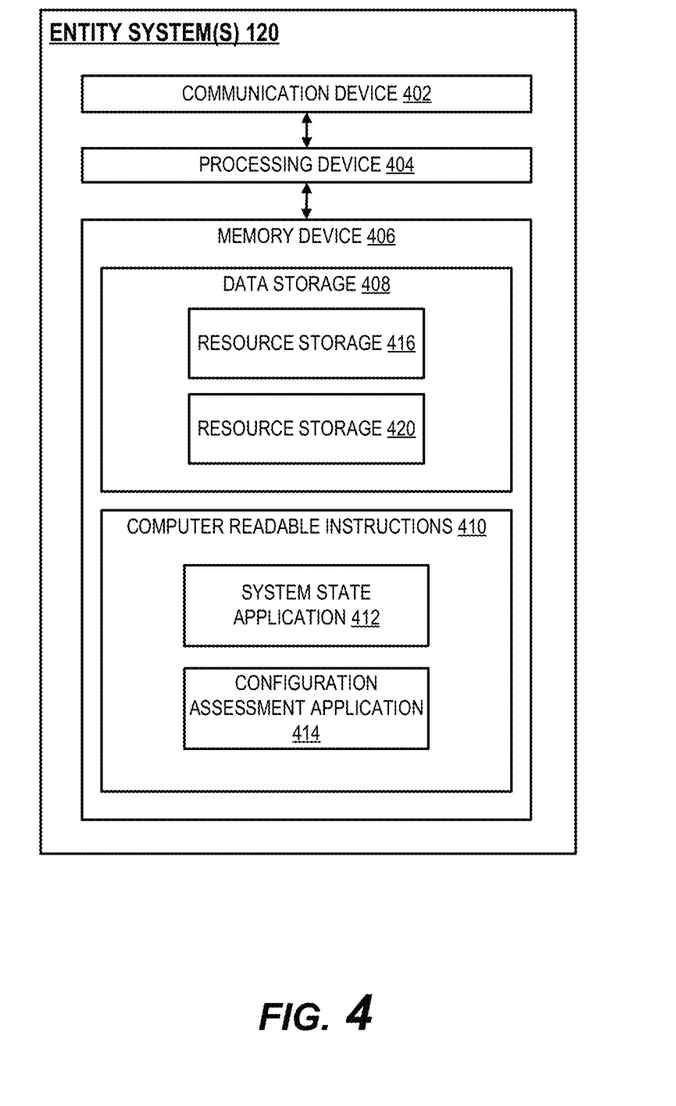
FIG. 4 provides block diagram of an entity system, in accordance with one embodiment of the invention.

FIG. 4 provides a block diagram of a resource aggregation and deployment engine or system 130, in accordance with one embodiment of the invention. The resource aggregation and deployment engine 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the resource aggregation and deployment engine 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the resource aggregation and deployment engine 130 comprises computer-readable instructions 310 stored in the memory device 306, which in one embodiment includes the computer-readable instructions 310 of a resource aggregation and deployment application 312 and an artificial intelligence application 314 which further comprises a machine learning engine. In one embodiment, the artificial intelligence application 322 and machine learning engine may be utilized by the resource aggregation and deployment application 312 to monitor and process received data for resource deployment decisioning.

In some embodiments, the memory device 306 includes data storage 308 for storing data related to the system environment, but not limited to data created and/or used by the resource aggregation and deployment application 312 and the artificial intelligence application and machine learning engine 314, such as a historical interaction database 316, user profile database 318, and resource deployment database 320.

The historical interaction database 316 is used to store information regarding past interactions (e.g., account actions, transactions, communications, inputs) with the user 102. In some embodiments, the historical interaction database 316 may be configured to store data from an incoming data stream in real-time. The user profile database 318 is used to store user profiles generated by the system from the collected user data and information (e.g., historical data, resource data, etc.). The system may be configured to access and update the stored user profiles from the user profile database 318 as additional information is collected. The resource deployment database 320 is used for storing aggregated resources and calculated resource deployment options as determined by the system. In one embodiment, the system continuously updates the resource deployment options based on continued or subsequent user interactions and data collected by the system.

In one embodiment of the invention, the resource aggregation and deployment engine 130 may associate with applications having computer-executable program code that instruct the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the resource aggregation and deployment engine 130 further comprises a dynamic optimization algorithm to be executed by the processing device 304 or a controller for calibrating or tuning resource deployment options from large collections of available resources and resource locations. The dynamic optimization algorithm may further be updated with new information associated with current user decisions, wherein the new information may be continuously injected back into the optimization algorithm in response to real-time decisioning.

As illustrated in detail in FIG. 4, the environment 100 further includes one or more entity systems 120 which are connected to the user device 110 and the resource aggregation and deployment system 130. The entity systems may be associated with one or more entities, institutions or the like. The entity system 120 generally comprises a communication device 402, a processing device 404, and a memory device 406 further comprising data storage 408. The entity system 120 comprises computer-readable instructions 410 stored in the memory device 406, which in one embodiment includes the computer-readable instructions of an entity application 412 and a rewards application 414. The entity system 120 may communicate with the user device 110 and the resource aggregation and deployment engine 130 to provide access to one or more resource locations stored and maintained on the entity system 120. In some embodiments, the entity system 120 may communicate with resource aggregation and deployment engine 130 during an interaction with a user 102 in real-time, wherein user interactions may be monitored and processed by the resource aggregation and deployment engine 130.

In some embodiments, the resource aggregation and deployment engine 130 may be configured to analyze and process complex, multi-faceted interactions. Multi-faceted interactions are interactions potentially requiring deployment of a combination of resources in order to meet the requirements of the interaction, the deployment of the combination of resources comprising layers of interconnected resources operating in unison. As the various resource layers may be combined in a number of ways, the complexity of determining an optimal solution (e.g., maxima or minima) increases with the inclusion of additional variables (i.e., available resource options). The resource aggregation and deployment engine 130 as described herein may be configured to analyze and process the various resource layers and connections present in a multi-faceted interaction. Furthermore, the system may be configured to configure or tune deployment of the user resources in order to optimize resource potential (e.g., value) and/or provide an array of options for completing a multi-faceted interaction. In some embodiments, the system may leverage artificial intelligence and machine learning technology to analyze multivariable data in real-time and provide an assortment of determined resource deployments for a collection of user resources.

In a specific example, a multi-faceted interaction may comprise a user scheduling a trip or vacation, wherein the user desires to reserve or plan for air travel, lodging, transportation (e.g., rental car), dining, entertainment, and the like using a variety of resources (e.g., a combination of different credit cards each having different structured rewards systems). The resource aggregation and deployment engine 130 may be configured to aggregate the various resources of the user and calculate a deployment of the user resources that may, for example, maximize earned rewards, minimize costs, and/or meet custom user-specified conditions a custom (e.g., a combination of maximizing rewards and minimizing costs).

Figure 5:
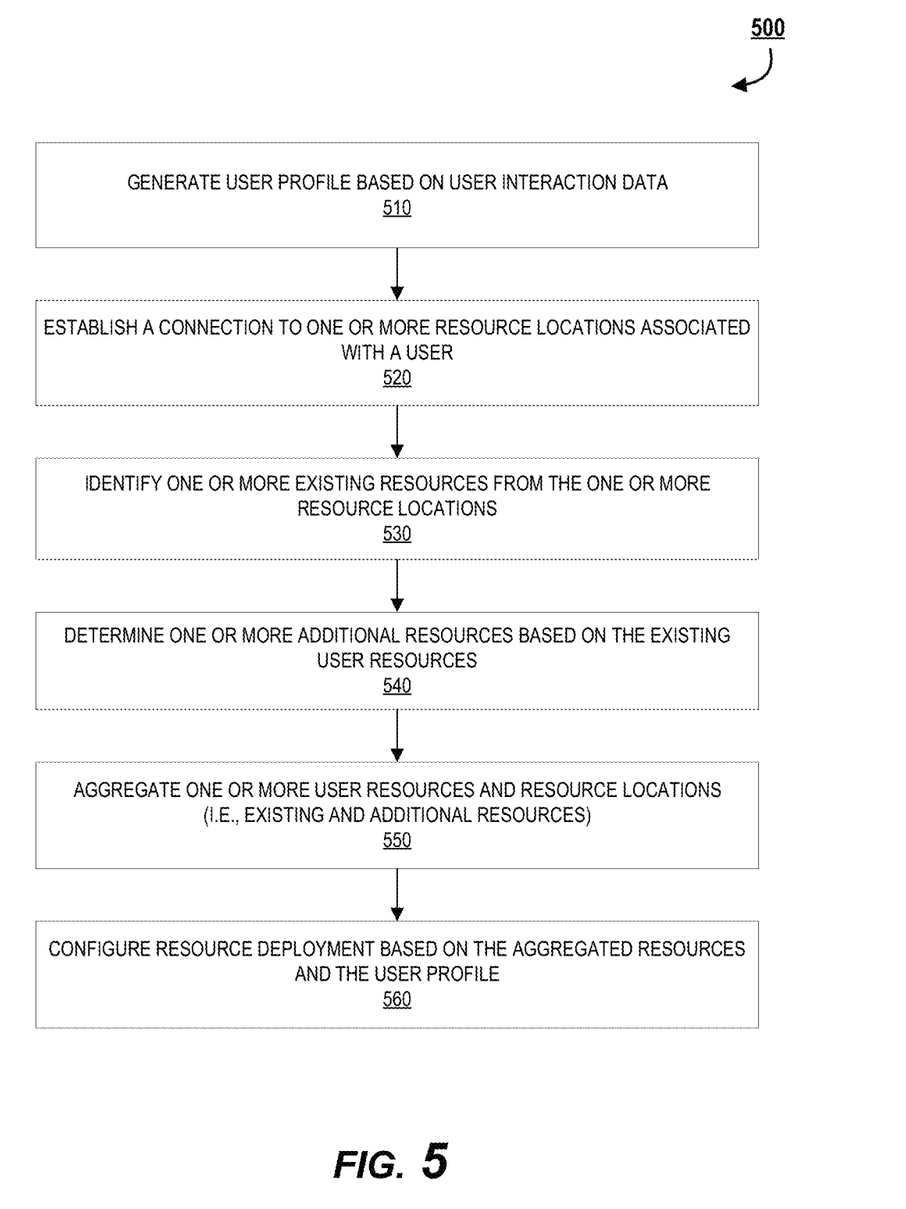
FIG. 5 provides a high level process flow illustrating resource aggregation and deployment, in accordance with one embodiment of the invention.

FIG. 5 provides a high level process flow illustrating resource aggregation and deployment, in accordance with one embodiment of the invention. As illustrated in block 510, the system generates a user profile based on user interaction data and/or other user information. User information may be collected by the system either directly from the user by the resource aggregation and deployment engine 130 and/or indirectly from an entity system 120 with which the user maintains a relationship (e.g., maintains an account or other resource location). The user information and/or interaction data may comprise historical data and/or real-time data collected continuously by the system as interactions occur. For example, real-time data collection may include collecting information associated with a user transaction in real-time as the transaction is occurring or shortly thereafter, wherein a user profile may be updated to immediately reflect the recent transaction.

In some embodiments, collected user information may include user identifying information, communication history, interaction information, and the like. Data, such as user interaction data or information, may be acquired from across communication channels such as phone lines, text messaging systems, email, applications (e.g., mobile applications), websites, ATMs, card readers, call centers, electronic assistants, instant messaging systems, interactive voice response (IVR) systems, brick-and-mortar locations and the like. In some embodiments, the system may be configured to identify and collect data associated with intended or predicted interactions as indicated by user actions, communications, and/or trends identified as being typical of the user. The system may identify the predicted interaction as an upcoming or pending interaction allowing for pre-processing and preemptive decisioning for the interaction by the resource aggregation and deployment engine 130. In some embodiments, the interaction information stored in the user profile may include complex or multi-faceted interactions. In one embodiment the system may store data associated with user resources in the user profile.

In one embodiment, the system may identify related user profiles based on the collected user information and data. For example, the system may identify related user profiles for family members, coworkers, or the like. In one embodiment, the system may link related user profiles, wherein the system inputs and analyzes all of the linked profiles when determining a resource deployment or determining additional eligible resources associated with at least one of the linked profiles. For example, a user may be scheduling a family trip and the system may identify profiles for the user's family and automatically extract and aggregate the family's user profiles when determining a resource deployment.

As illustrated in block 520, the system establishes a connection to one or more resource locations associated with the user. The one or more resource locations may be further associated with one or more entity systems 120. For example, the resource location may be associated with the user but stored and maintained on an entity system. A variety of resource locations may be held across several, disparate entity systems (e.g., third-party entity systems), wherein the system described herein connects with the disparate systems to provide a unified platform and holistic view for managing all connected user resources for collective resource decisioning and deployment. In one embodiment, the system requires authorization from a user to establish the connection. The user may be prompted to provide authentication information to authorize access by the system to a resource location associated with the user.

Using the established connection, the system identifies one or more existing resources from the one or more resource locations associated with the user, as illustrated in block 530. An existing resource comprises any resource known and/or used by the user for completing interactions. In one embodiment, an existing resource is a resource that is actively used by the user to complete interactions. In some embodiments, an existing resource may be a resource that is inefficiently utilized or neglected by a user. For example, an existing resource may be an inactive or temporarily suspended resource associated with the user. Existing resources may further comprise any supplemental resources associated with an existing resource. For example, a supplemental resource may include rewards points accrued for using an existing resource such as a credit card to complete interactions. Existing resources may further be identified from the user information such as in historical interaction data, wherein an existing resource was used to complete a past interaction. In a specific example, the system may identify that a user has an applicable frequent flyer number with a particular airline that has not been included in the interaction. The system may prompt or notify the user to include the neglected resource and/or automatically include the resource after identification.

Additionally, the system is further configured to determine one or more additional resources as illustrated in block 540. An additional resource is a new resource that is not currently associated with a user but is available for association with the user. In a specific example, an additional resource may comprise a new credit card that a user is eligible to receive through enrollment. In some embodiments, the system may determine an additional resource based on the existing user resources by determine similar or complementary additional resource to existing resources. In another embodiment, the system may determine additional resources from the one or more entity systems. In another specific example, the system may pull or extract information related to potential additional resources for which a user is eligible from a third-party entity system. Additional resources may further comprise any supplemental resources associated with an additional resource such as the potential for earning reward points and enrollment bonuses. In some embodiments, the system may be configured to automatically enroll a user in one or more additional resources.

As illustrated in block 550, the system aggregates the one or more user resources and resource locations. Aggregation of the user resources may include both existing resources and additional resource identified by the system, wherein all resources identified by the system across the connections with various entity systems are viewable together. The system is able to configure a resource deployment based on the aggregated resources and the user profile as illustrated in block 560. Configuration of a resource deployment comprises analyzing and processing the aggregated resources (i.e., existing, additional, supplemental) along with the generated user profile to determine or calculate a particular deployment of the resources for completing an interaction based on a desired outcome of the interaction by the user.

In one embodiment, the system may determine an optimal solution (e.g., maxima or minima) for deploying user resources. In another embodiment, the system may be configured to configure or fine-tune deployment of the user resources to optimize resource potential (e.g., value). For example, the system may be configured to aggregate the various resources of the user and calculate a deployment of the user resources that may, for example, maximize rewards earned, minimize costs, and/or meet custom user-specified conditions (e.g., a combination of maximizing rewards and minimizing costs). In another embodiment, the system may calculate and provide an array of options for completing an interaction, wherein the system is configured to present the user with the array of options via user interface. The user may input a selected option with which to complete an interaction.

In one embodiment, the system is configured for determining one or more deployments for a multi-faceted interaction. In some embodiments, the system leverages artificial intelligence and machine learning technology for configuring a complex multivariable resource deployment.

In some embodiments, the system may be configured to inject a user selection or decisions (i.e., for completing an interaction) back into the resource aggregation and deployment engine. In this way the user data and resource information is updated and included when calculating a subsequent interaction. By injecting user decisions back into the resource aggregation and deployment engine in real-time, the system may provide a continuously evolving view of the user and associated resources for optimized, in-the-moment decisioning and adaptable resource deployment.

Figure 6:
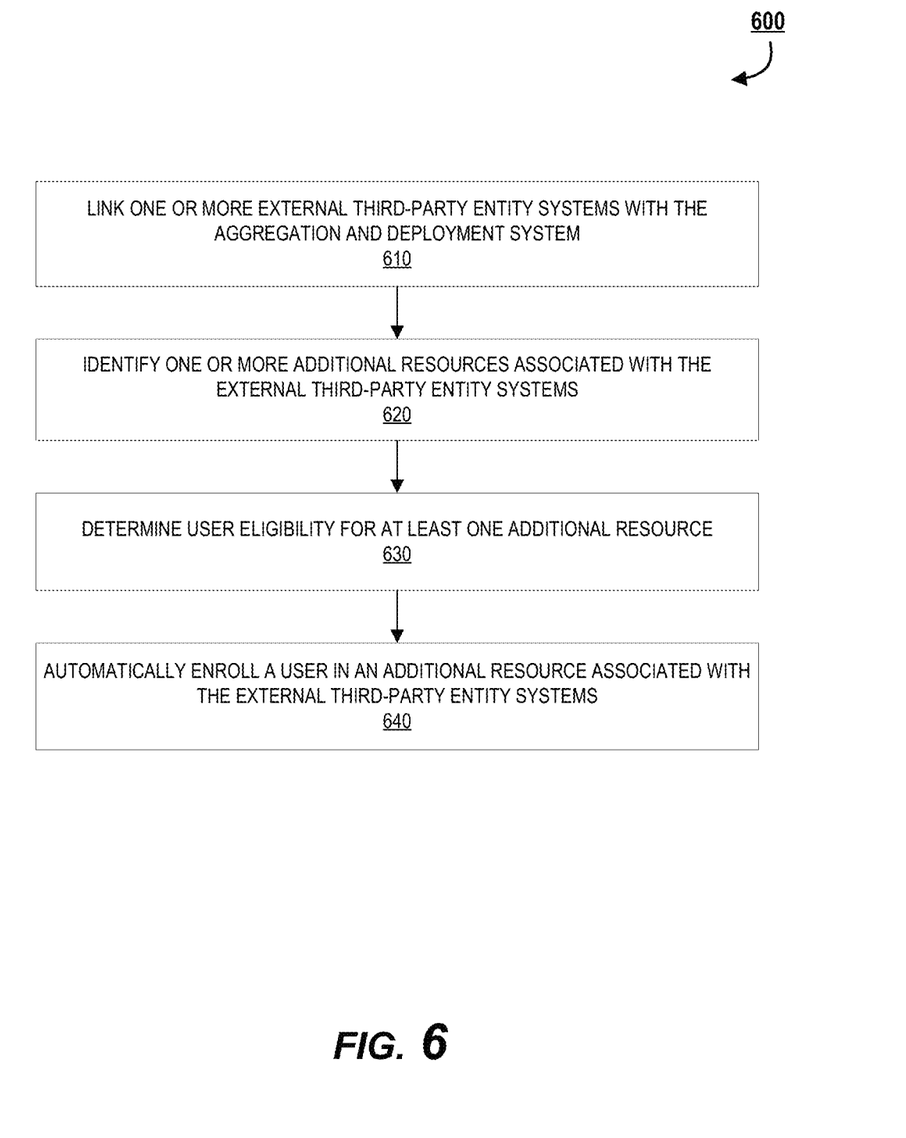
FIG. 6 provides a high level process flow for connecting the resource aggregation and deployment system to external third-party entity systems, in accordance with one embodiment of the invention.

In some embodiments, the resource aggregation and deployment system 130 may be configured to reach out and link to the external entity systems 120 to provide entity input to the system 130. In this way an external entity such as a third-party merchant may experience enhanced interaction with users thereby improving user-merchant relationships. FIG. 6 provides a high level process flow for connecting the resource aggregation and deployment system to external third-party entity systems, in accordance with one embodiment of the invention. As illustrated in block 610, the system links one or more external third-party entity systems with the aggregation and deployment system. In some embodiments, the aggregation and deployment system 130 establishes a connection to the one or more external entity systems over the network 701 allowing for direct involvement in the resource aggregation process.

Using the established connection with the linked external entity systems, the resource aggregation and deployment system identifies one or more additional resources as illustrated in block 620. An additional resource is a new resource that is not currently associated with a user but is available for association with the user. As illustrated in block 630, the system determines user eligibility for at least one additional resource. For example, a third-party entity may offer a user a new resource, resource location, or resource vehicle to a user based on user information in a user profile such as historical interaction information. Offers for additional resources may be tailored by the third-party entity for the user by leveraging the information available via the link to the aggregation and deployment system 130 described herein.

As illustrated in block 640, the system may be configured to automatically enroll a user in an additional resource associated with the external third-party entity systems. The system may automatically enroll a user in an additional resource (e.g., reward points, signing bonuses), resource location (e.g., accounts), and/or resource vehicle (e.g., credit card) identified through the link to the external entity system. In some embodiments, the system requests user authorization before automatically enrolling the user. In one embodiment, after identifying one or more eligible additional resources, the system is configured to present the identified additional resources to the user via a user interface (e.g., via the user application of the user device). The system may be further configured to receive a user selection of a presented additional resource and, in response, automatically enroll the user via the linkage between the aggregation and deployment system 130 and the external entity system.

In some embodiments, the system may provide external third-party entity systems access to information and data from generated user profiles. A third-party entity may use the holistic view of a user provided by a user profile to, for example, provide tailored or targeted offers to the user thereby improving interactions between the third-party entity and the user while also potentially increasing a perceived value of an interaction for both parties. In these embodiments, the system may be configured to first prompt the user to provide authorization before providing the information and data from the user profile to an external third-party entity system.

Figure 7:
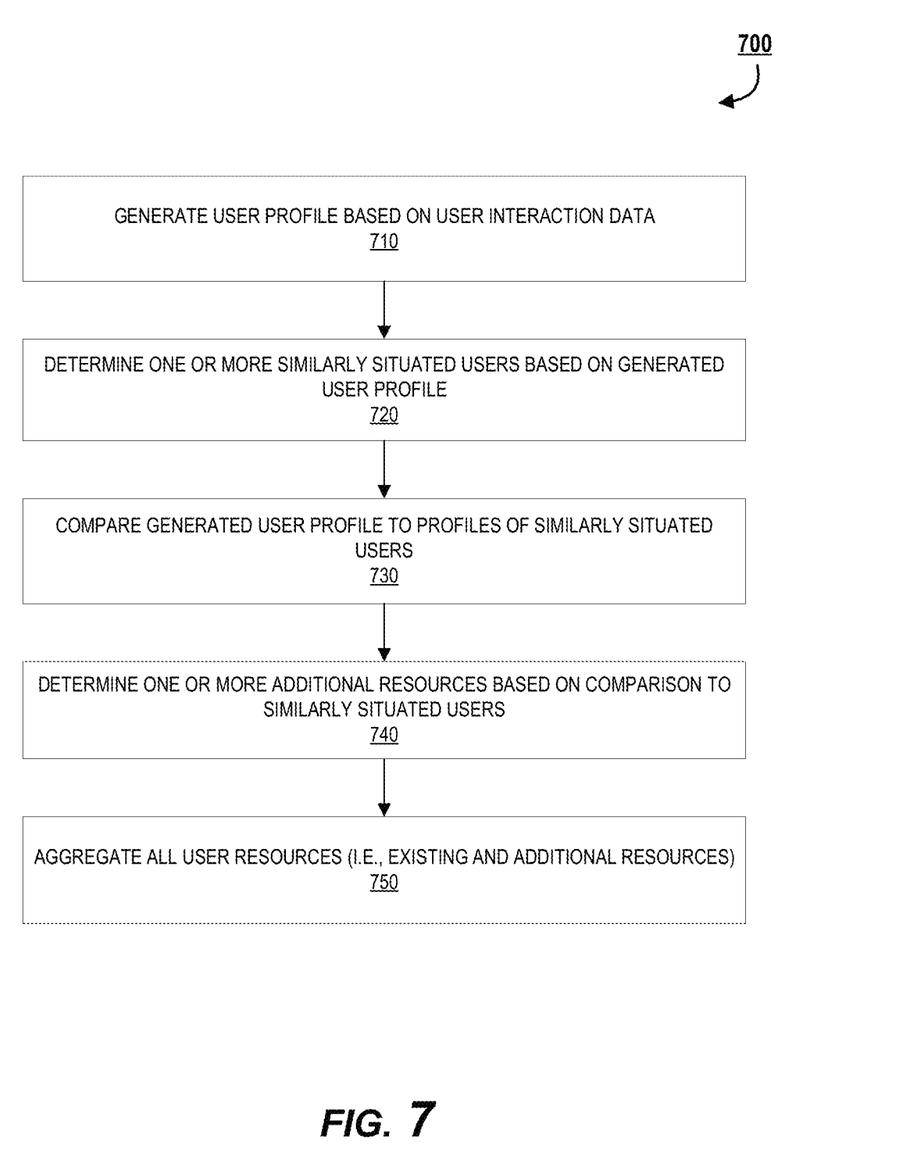
FIG. 7 provides a high level process flow for determining additional resources based on similar users, in accordance with one embodiment of the invention.

In some embodiments, the resource aggregation and deployment system 130 may be further configured to identify additional resources based on similarly situated users. FIG. 7 provides a high level process flow for determining additional resources based on similar users, in accordance with one embodiment of the invention. As illustrated in block 710, the system generates a user profile based on user interaction data and/or other user information as previously discussed. In some embodiments, the system may be configured to generate and store user profiles for a plurality of users.

As illustrated in blocks 720 and 730 respectively, the system determines one or more similarly situated users based on the generated user profile and compares the generated user profile to profiles of the similarly situated users. Next, as illustrated in block 740, the system determines one or more additional resources based on the comparison. The system may provide the user with recommendations for additional resources based on the similarly situated users as determined from the extracted information. For example, the system may recommend the same additional resource to the user as is owned by one or more similarly situated users. In some embodiments, the system may identify the extent that the user is dissimilar to other similar situated users and based on the identified differences, recommend different additional resources. In a specific example, the system may determine that the user prefers to travel via airplane frequently and recommend one or more additional resources associated with another user who also travels via airplane frequently.

As illustrated in block 750, the system aggregates all of the resources for a particular user including the existing and additional resources. The total collection of resources may be used by the system to calculate resource deployment as discussed herein.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for implementing smart contract oversight for automatic electronic resource transfers, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/414,141 | MULTI-FACETED RESOURCE AGGREGATION ENGINE FOR LINKING EXTERNAL SYSTEMS | Filed Concurrently Herewith |
| 16/414,130 | NETWORK ENGINE FOR INTELLIGENT PASSIVE TOUCH RESOURCE ANALYSIS | Filed Concurrently Herewith |

What is claimed is:

1. A system for multi-faceted resource aggregation and deployment, the system comprising:
 a memory device with computer-readable program code stored thereon;
 a communication device connected to a network; and
 a processing device, wherein the processing device is configured to execute the computer-readable program code to:
 generate a user profile comprising historical user interaction data associated with a user;
 establish a connection to a resource location associated with the user;
 identify an existing resource associated with the resource location;
 determine an additional resource based on identifying the existing resource, wherein the additional resource is complementary to the existing resource;
 aggregate the existing resource and the additional resource into a multivariable resource collection; and
 configure a resource deployment based on the multivariable resource collection and the user profile, wherein the resource deployment is configured to complete a multi-faceted interaction using a combination of the multivariable resource collection.

2. The system of claim 1, wherein the processing device is further configured to:
 compare the user profile to a plurality of stored user profiles associated with other users;

determine a similarly situated user from the other users based on comparison of the user profile; and identify the additional resource based on at least one resource associated with the similarly situated user.

3. The system of claim 1, wherein the system further comprises at least one of an artificial intelligence system and a machine learning system configured for processing the multivariable resource collection.

4. The system of claim 1, wherein the processing device is further configured to determine an array of resource deployment options for completing the multi-faceted interaction.

5. The system of claim 1, wherein completing the multi-faceted interaction comprises determining a maxima or minima solution associated with the multivariable resource collection.

6. The system of claim 1, wherein completing the multi-faceted interaction comprises configuring the resource deployment to maximize a supplemental resource or minimize a cost of the multi-faceted interaction.

7. The system of claim 1, wherein the additional resource is associated with a third-party entity system, and wherein the processing device is further configured to:

establish an external link to the third-party entity system; and enroll the user automatically with the additional resource via the external link to the third-party entity system, wherein the resource further comprises a resource vehicle and a resource location maintained by the third-party entity system.

8. The system of claim 7, wherein the processing device is further configured to:

present the additional resource to the user via an interface of a user application; and receive authorization from the user before automatically enrolling the user with the additional resource.

9. A computer program product for multi-faceted resource aggregation and deployment, wherein the computer program product comprises a non-transitory computer-readable medium comprising computer-readable instructions, the computer-readable instructions, when executed by a processing device, cause the processing device to:

generate a user profile comprising historical user interaction data associated with a user;

establish a connection to a resource location associated with the user;

identify an existing resource associated with the resource location;

determine an additional resource based on identifying the existing resource, wherein the additional resource is complementary to the existing resource;

aggregate the existing resource and the additional resource into a multivariable resource collection; and configure a resource deployment based on the multivariable resource collection and the user profile, wherein the resource deployment is configured to complete a multi-faceted interaction using a combination of the multivariable resource collection.

10. The computer program product of claim 9, wherein the computer-readable instructions, when executed by the processing device, cause the processing device to:

compare the user profile to a plurality of stored user profiles associated with other users;

determine a similarly situated user from the other users based on comparison of the user profile; and identify the additional resource based on at least one resource associated with the similarly situated user.

11. The computer program product of claim 9, further comprising at least one of an artificial intelligence system and a machine learning system configured for processing the multivariable resource collection.

12. The computer program product of claim 9, wherein the computer-readable instructions, when executed by the processing device, cause the processing device to determine an array of resource deployment options for completing the multi-faceted interaction.

13. The computer program product of claim 9, wherein completing the multi-faceted interaction comprises determining a maxima or minima solution associated with the multivariable resource collection.

14. The computer program product of claim 9, wherein completing the multi-faceted interaction comprises configuring the resource deployment to maximize a supplemental resource or minimize a cost of the multi-faceted interaction.

15. The computer program product of claim 9, wherein the additional resource is associated with a third-party entity system, and wherein the processing device is further configured to:

establish an external link to the third-party entity system; and enroll the user automatically with the additional resource via the external link to the third-party entity system, wherein the resource further comprises a resource vehicle and a resource location maintained by the third-party entity system.

16. The computer program product of claim 15, the computer-readable instructions, when executed by the processing device, cause the processing device to:

present the additional resource to the user via an interface of a user application; and receive authorization from the user before automatically enrolling the user with the additional resource.

17. A computer-implemented method for multi-faceted resource aggregation and deployment, the computer-implemented method comprising:

generating a user profile comprising historical user interaction data associated with a user;

establishing a connection to a resource location associated with the user;

identifying an existing resource associated with the resource location;

determining an additional resource based on identifying the existing resource, wherein the additional resource is complementary to the existing resource;

aggregating the existing resource and the additional resource into a multivariable resource collection; and configuring a resource deployment based on the multivariable resource collection and the user profile, wherein the resource deployment is configured to complete a multi-faceted interaction using a combination of the multivariable resource collection.

18. The computer-implemented method of claim 17, further comprising:

comparing the user profile to a plurality of stored user profiles associated with other users;

determining a similarly situated user from the other users based on comparison of the user profile; and identifying the additional resource based on at least one resource associated with the similarly situated user.

19. The computer-implemented method of claim 17, further comprising at least one of an artificial intelligence system and a machine learning system configured for processing the multivariable resource collection.

20. The computer-implemented method of claim 17, further comprising determining an array of resource deployment options for completing the multi-faceted interaction.

\* \* \* \* \*